(12) United States Patent
Silver

(10) Patent No.: US 7,147,883 B1
(45) Date of Patent: Dec. 12, 2006

(54) COMPOSITIONS CONTAINING AT LEAST ONE POLYOL AND INULIN CHARACTERIZED BY REDUCED TENDENCIES OF THE AT LEAST ONE POLYOL TO INDUCE ACUTE DIARRHEA

(76) Inventor: Barnard S. Silver, 4390 S. 2300 East, Holladay, UT (US) 84124-3651

( * ) Notice: Subject to any disclaimer, the term of this patent is extended or adjusted under 35 U.S.C. 154(b) by 0 days.

(21) Appl. No.: 10/981,335

(22) Filed: Nov. 3, 2004

Related U.S. Application Data

(63) Continuation-in-part of application No. 10/443,935, filed on May 22, 2003, which is a continuation-in-part of application No. 09/618,813, filed on Jul. 18, 2000, which is a continuation-in-part of application No. 09/553,973, filed on Apr. 20, 2000, now abandoned, which is a continuation-in-part of application No. 09/379,952, filed on Aug. 24, 1999, now Pat. No. 6,399,142.

(60) Provisional application No. 60/104,091, filed on Oct. 13, 1998, provisional application No. 60/098,195, filed on Aug. 27, 1998.

(51) Int. Cl.
*A23L 1/236* (2006.01)
*A23G 3/00* (2006.01)

(52) U.S. Cl. .................. 426/548; 426/658; 536/128

(58) Field of Classification Search .......... 426/548, 426/549, 580, 582, 583, 590, 658, 660; 536/124, 536/128
See application file for complete search history.

(56) References Cited

U.S. PATENT DOCUMENTS

| | | | |
|---|---|---|---|
| 4,042,714 A | 8/1977 | Torres | |
| 4,304,768 A | 12/1981 | Staub et al. | |
| 4,311,722 A | 1/1982 | Vink et al. | |
| 4,746,520 A | 5/1988 | Smits et al. | |
| 5,098,730 A | 3/1992 | Pepper et al. | |
| 5,238,698 A | 8/1993 | Zumbé et al. | |
| 5,319,048 A | 6/1994 | Carosino et al. | |
| 5,366,962 A | 11/1994 | Biton et al. | |
| 5,490,996 A | 2/1996 | Despland et al. | |
| 5,527,556 A | 6/1996 | Frippiat et al. | |
| 5,547,697 A | 8/1996 | Lipsch et al. | |
| 5,659,028 A | 8/1997 | Coussement et al. | |
| 5,721,004 A * | 2/1998 | James | 426/573 |
| 5,827,526 A | 10/1998 | Dohnalek et al. | |
| 5,840,884 A | 11/1998 | Lis et al. | |
| 5,882,709 A | 3/1999 | Zumbe | |
| 5,989,619 A | 11/1999 | Zumbe et al. | |
| 6,387,422 B1 | 5/2002 | Campbell | |
| 6,423,358 B1 | 7/2002 | Barndt et al. | |

FOREIGN PATENT DOCUMENTS

| | | |
|---|---|---|
| DE | 195 14 274 A1 | 10/1996 |
| EP | 0 787 745 A2 | 8/1997 |
| EP | 0 861 852 A1 | 9/1998 |
| WO | WO 91/13076 | 9/1991 |
| WO | WO 93/02566 | 2/1993 |
| WO | WO 98/38223 | 9/1998 |
| WO | WO 98/42206 | 10/1998 |

OTHER PUBLICATIONS

John Peldyak, DMD, "Xylitol: Sweeten Your Smile," 1996, pp. 2-52.
Teeuwen, H.; Thoné, M. ; Vandorpe, J. "Inulin: A Versatile Ancient Food Ingredient Rediscovered"; *International Food Ingredients*, No. 5, 1992, pp. 10-14.
Birch, G. G.; Soon, E. B. T. The Composition and Properties of Diabetic Jams; *Confectionery Production*, Feb. 1973, pp. 73-76.
Hershey's, Sugar Free, Faq's, printed from the Internet at http://www.hersheys.com/sugargree/gaqs/index.asp, dated Mar. 2, 2006.
Living Well, publication of Cooperative Extension-Northwest Region, Pennstate, College of Agricultural Science, vol. 04, Issue 1, Fall 2004.
Polyols: "Sugar Replacers" that are sure to please your sweet tooth by Loveda C. Perry, Extension Agent, Expanded Food & Nutrition Education Program, Hillsborough County Family & Consumer Sciences Sep. 2005 Newsletter, University of Florida, Institute of Food and Agricultural Sciences, p. 4, printed from the Internet at http://hillsboroughfcs.ifas.ufl.edu/Newsletters/05/2005, dated Mar. 1, 2006.
Sugar Alcohols (polyols) & Polydextrose Used as Sweeteners in Foods, health Canada, Food & Nutrition, printed from the Internet at http://www.hc-sc.gc.ca/fn-an/securit/facts-faits/aspartame/polyols_polydextrose_factsheet-p..., dated Jan. 2006.
Times Record, Jan. 24, 2006, Valley City, Barnes County, North Dakota, printed from the Internet at http://www.times-online.com/articles/2006/01/23/news/06yourhealth.txt, dated Mar. 1, 2006.
Sweet Nothings—not all sweeteners are Equal, Nutrition Action Healthletter, May 2004.
Demystifying Sugar Substitutes, The Nibble, Great Finds For Foodies, printed from the Internet at http://www.thenibble.com/reviews/diet/sweeteners.asp , dated Mar. 2, 2006.
SB Diet-SB Diet Message Boards, Sugar Alcohol vs. Sugar, printed from the Internet at http://www.southbeach-diet-plan.com/forum/viewtopic, dated Mar. 2, 2006.

(Continued)

*Primary Examiner*—Leslie Wong
(74) *Attorney, Agent, or Firm*—Brinks Hofer Gilson & Lione

(57) ABSTRACT

A composition containing at least one polyol and certain amounts of inulin relative to the at least one polyol, characterized by a reduced tendency of the at least one polyol to induce acute diarrhea. The at least one polyol may be, for example: xylitol, sorbitol, maltitol, mannitol, isomalt, isomaltitol, lactitol, hydrogenated starch hydrolysates (HSH), glycerol, propylene glycol, erythritol, galactitol and combinations thereof. The composition also contains inulin in amounts sufficient to at least partially reduce, or eliminate, the tendency of the polyol to induce acute diarrhea. Foodstuffs, including drinks and beverages, contain said compositions.

58 Claims, 1 Drawing Sheet

OTHER PUBLICATIONS

Entrez-PubMed, AnnuRevNutr. 1989, 9:161-86, PMDID:2669868 [PubMed-indexed for MEDLINE].

Letter to the Honorable Jane Henney, M.D., CSPA Newsroom, Center for Science in the Public Interest (CSPA).

A Quick Primer on Sugar Alcohols, Diabetes Information Library, printed from the Internet at http://www.diabetessymptom.net/news/news_item.cfm, dated Mar. 1, 2006.

Candy wrapper, Hershey's Chocolate Candy with Almonds, Sugar Free, Net Wt. 3 oz. (85 g).

Candy wrapper, Reese's Peanut Butter Cups Miniatures, Sugar Free, New Wt. 3 oz. (85 g).

Candy wrapper, York (Get the sensation!), Chocolate Candy Covered Peppermint Pattie, Sugar Free, Net Wt. 3 oz. (85 g).

Sugars and Sweetners in Food, Cooperative Extension Service, College of Tropical Agriculture and Human Resources, University of Hawaii at Manoa, Mar. 2005, FST-16.

Chewing over Sweetener Claims, Wall Street Journal, Tuesday, Feb. 7, 2006.

Candy Wrapper, Fannie Mae Candies.

Candy Wrapper, EDA Candies, Lehman Sugar Free Confections, Inc.

* cited by examiner

COMPOSITIONS CONTAINING AT LEAST ONE POLYOL AND INULIN CHARACTERIZED BY REDUCED TENDENCIES OF THE AT LEAST ONE POLYOL TO INDUCE ACUTE DIARRHEA

RELATED APPLICATIONS

This application is a continuation-in-part of application Ser. No. 09/618,813, filed Jul. 18, 2000, which is a continuation-in-part of application Ser. No. 09/553,973 filed Apr. 20, 2000, now abandoned, which is a continuation-in-part of application Ser. No. 09/379,952 filed Aug. 24, 1999, now U.S. Pat. No. 6,399,142, which claims the priority of provisional application Ser. No. 60/098,195, filed Aug. 27, 1998, and Ser. No. 60/104,091, filed Oct. 13, 1998, and a continuation-in-part application Ser. No. 10/443,935, filed May 22, 2003, all of the foregoing of which are incorporated herein by reference. In the event of any inconsistent disclosure or definition in the prior applications from the present application, the disclosure or definition herein shall be deemed to prevail.

FIELD OF THE INVENTION

The present invention relates to compositions containing at least one polyol and inulin characterized by reduced tendencies of the at least one polyol upon ingestion to induce acute diarrhea compared to the ingestion of at least one polyol without inulin. More particularly, the present invention relates to anti-diarrheal polyol sweetening compositions comprising at least one polyol and sufficient inulin to at least partially reduce the tendency of the at least one polyol to induce acute diarrhea upon ingestion thereof.

BACKGROUND

A review of the recent literature of polyols (frequently called "sugar alcohols") demonstrates that they are increasingly popular substitutes for sucrose. The substitution of all, or a portion, of the sucrose in a foodstuff with one or more polyols has a number of advantages that are well-appreciated. Of particular interest to the health- and fitness-conscious public, foodstuffs sweetened with polyols (e.g., xylitol, sorbitol, lactitol, or erythritol) have fewer calories than their sucrose-containing counterparts. In addition, the lower glycemic index of polyols, as compared to sugars such as sucrose and glucose, has led to the widespread use of polyols as sweeteners in diabetic foods, or for weight loss, or weight control. Furthermore, the well-established dental benefits of using polyols, such as xylitol, in place of sweeteners, such as sucrose (e.g., dramatic reductions in new tooth decay, arrest and, in some instances, reversal of existing dental decay) makes polyols desirable for use as sweeteners in a wide variety of foodstuffs. The advantages of substituting all, or a portion, of the sucrose in a foodstuff with a polyol, specifically xylitol, is described at length in the essay "Xylitol, Sweeten Your Smile" by John Peldyak, DMD. Additionally, evidence suggests that the consumption of xylitol, and foodstuffs sweetened with xylitol, may be effective means for preventing and treating chronic ear infections (otitis media) in children (e.g., "A Sugarless Gum May Help to Prevent Ear Infections in Kids," by Tara Parker-Pope, in *The Wall Street Journal, Health Journal*, Jun. 30, 2000).

Polyols in foodstuffs, such as baked goods, are more resistant to mold and bacterial growth, since they do not absorb moisture as sucrose does.

A review of the recent literature of polyols, however, also demonstrates that, despite their many advantages, there is a serious problem in the use of polyols in compositions that are ingested. The serious problem is that the ingestion of polyols in certain amounts may result in unpleasant side effects which include acute, non-infectious, non-inflammatory diarrhea, and symptoms associated with acute diarrhea.

The various polyols have varying degrees of sweetness. As compared to sucrose, all the polyols, except xylitol, have a sweetness relatively less than sucrose.

TABLE 1

| Relative Sweetness | |
|---|---|
| Sucrose | 100% |
| Xylitol | 100% |
| Maltitol | 90% |
| Erythritol | 70% |
| Mannitol | 60% |
| Sorbitol | 60% |
| Isomalt | 50% |

Thus, apart from xylitol, more polyol is needed for sweetness than sucrose.

BRIEF SUMMARY

The scope of the present invention is defined solely by the appended claims, and is not affected to any degree by the statements within this summary.

This invention arises from the discovery that the tendency of polyols to induce acute diarrhea, and the effects of acute diarrhea, upon ingestion can be reduced, or even eradicated, by ingestion of inulin in sufficient amounts. Other health benefits from the combination of at least one polyol and sufficient amounts of inulin were also discovered as disclosed herein.

Briefly, one aspect of the present invention is directed to a composition containing at least one polyol, and inulin in therapeutically effective amounts to at least partially reduce the tendency of said at least one polyol to induce acute diarrhea when said at least one polyol is consumed in amounts that induce diarrhea without the ingestion of any inulin.

In another aspect, the present invention is directed to a method which comprises ingesting at least one polyol in amounts sufficient to induce acute diarrhea in the absence of ingested inulin, and ingesting inulin in amounts sufficient to at least partially reduce the acute diarrhea that is induced by the said at least one polyol in the absence of ingestion of inulin.

In another aspect, the present invention is directed to compositions, including sweetening compositions, or food compositions, comprising at least one polyol, and inulin in which said inulin is present in amounts of at least about 25% by weight of the combination of the polyol, or polyols, and inulin.

In another aspect, the present invention is directed to a foodstuff which comprises such a composition. The composition includes at least one polyol. The polyol composition further includes inulin in amounts of at least 25% by weight of the combination of the at least one polyol and the inulin.

In another aspect, the present invention is directed to a method for preparing a foodstuff comprised of a plurality of ingredients. The method comprises: (a) combining a first of the ingredients containing at least one polyol, with (b) a second of the ingredients comprising inulin, or inulin fractions, in an amount which comprises at least about 25% by weight of the combination of said at least one polyol and said inulin. The aforementioned first and second of the ingredients can be either the same ingredient or else different ingredients. The first and second ingredients can be added to the foodstuff either in combination or at the same tine or in separate portions at separate times.

In another aspect, the present invention is directed to a method for preparing a foodstuff. The method comprises adding to said foodstuff (i) at least one sweetening agent having at least one polyol, and (ii) inulin, which comprises at least about 25% by weight of the combination of said at least one polyol and said inulin. The at least one polyol and the inulin can be added to the foodstuff either in combination or at the same time, or else in separate portions at different times.

In another aspect, the invention is directed to beverages containing at least one polyol, such as erythritol, or xylitol, or the combination of the foregoing, and inulin present in sufficient amounts to reduce the tendency of the at least one polyol to induce acute diarrhea that occurs in the absence of inulin. Preferably, the inulin employed in beverages comprises the water soluble, low molecular weight fraction in which at least 75% of the inulin polysaccharides have molecular weights of about 2288 and below.

It has been discovered that the unpleasant Taxation side effects associated with consumption of foodstuffs sweetened by polyol can be reduced, or eliminated, by incorporating inulin into the sweetening compositions in certain minimum amounts of inulin as explained herein.

DETAILED DESCRIPTION OF THE PRESENTLY PREFERRED EMBODIMENTS

Figure 1:
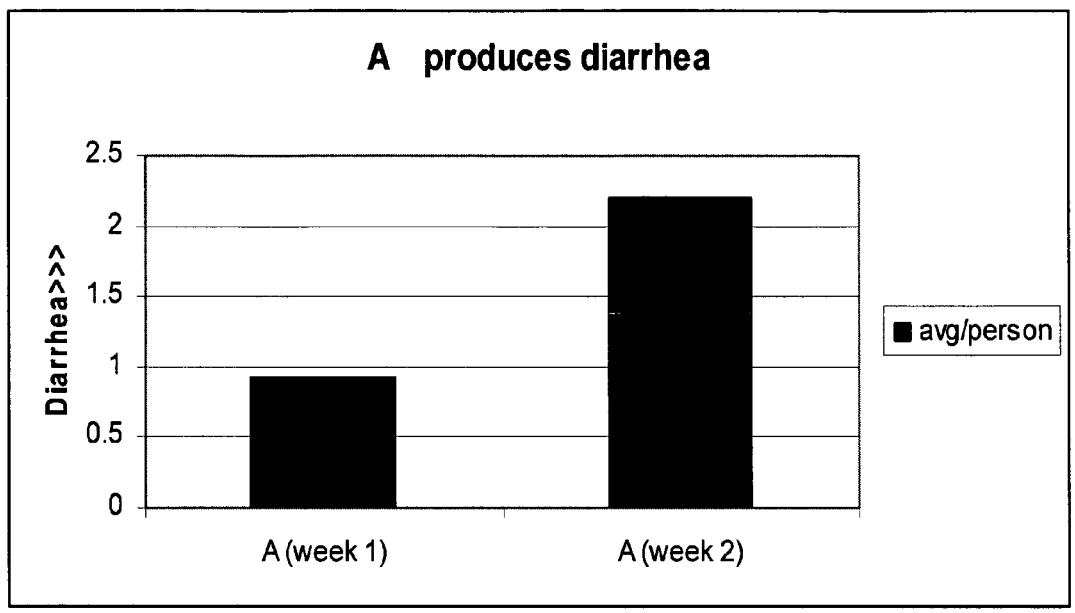
FIG. 1 is a graph illustrating the results of the human tests reported in Example 17 of ingesting the polyol xylitol without inulin.

The following definitions are to be understood throughout this description and in the appended claims:

A "foodstuff" is a substance that can be used or prepared for use as a food.

A "carbohydrate," as defined in Organic Chemistry, Second Edition by William H. Brown and Christopher S. Foote (Saunders, 1998), is a polyhydroxyaldehyde, polyhydroxyketone, or substance that gives these compounds upon hydrolysis. A "monosaccharide" is a carbohydrate that cannot be hydrolyzed to a simpler carbohydrate. A "disaccharide" is a carbohydrate containing two monosaccharide units joined by a glycoside bond. A "trisaccharide" is a carbohydrate containing three monosaccharide units joined by glycoside bonds. A "polysaccharide," as defined in Webster's Ninth New Collegiate Dictionary (Merriam-Webster, 1988), is a carbohydrate that can be decomposed by hydrolysis into two or more molecules of monosaccharides (thus, this definition subsumes the definition of disaccharide).

A "polyol" is the product obtained from the reduction of a carbohydrate, whereby the carbonyl group (C=O) of a monosaccharide unit is replaced with a CHOH moiety.

The phrase "composition containing at least one polyol" denotes a composition containing at least one polyol which tends to induce diarrhea, or symptoms associated with diarrhea, upon consumption in certain minimum amounts in the absence of ingestion of inulin.

The phrase "sweetening agent containing at least one polyol" refers to an agent containing at least one polyol which tends to impart a sweet taste in the mouth and, upon ingestion, tends to induce acute diarrhea, or symptoms of acute diarrhea in the absence of ingestion of inulin.

"Inulin" refers to a mixture of polysaccharides having various molecular weights or degrees of polymerization; in general, inulin consists of fructose units with beta 1–2 bonds terminating in a glucose unit. The term "inulin" is used generically herein to refer to raw inulin and fractions of inulin.

"Raw" inulin refers to inulin containing low molecular-weight and/or high molecular-weight polysaccharides extracted from plant materials. "Low molecular-weight inulin" refers to those fractions of inulin comprising polysaccharides having molecular weights primarily below about 2288. Low molecular weight inulin may be further defined as containing at least about 75 percent by weight of polysaccharides with molecular weights of about 2288, and below. Low molecular weight inulin fractions are water soluble and, therefore, preferred for many applications. "High molecular-weight inulin" refers to those fractions of inulin comprising polysaccharides having molecular weights primarily of about 2288, and above.

By "primarily" is meant at least about 75% by weight of the inulin fraction. "Intense sweeteners", a term well-known in the art, refers to compounds that are significantly sweeter than sucrose, such as, aspartame, sucralose, acesulfame-K, and the like.

"Health benefits" refers to reducing the tendency of a polyol, or polyols, to induce diarrhea upon ingestion which tends to occur upon ingestion of a polyol or polyols without ingestion of inulin. "Health benefits" also refers to lower fecal pH compared to the fecal pH without the ingestion of the combination of at least one polyol and inulin, and to the increase of the fecal mass upon ingestion of the combination of at least one polyol and inulin, compared to ingestion without inulin each one, or both, of which may contribute to healthy functioning of the intestines.

"Acute diarrhea" refers to any sudden and significant increase in the frequency or decrease in the consistency of the stool lasting less than four weeks. Acute diarrhea is distinguished from chronic diarrhea and infectious diarrhea.

A polyol sweetening composition embodying features of the present invention comprises at least one polyol and inulin in which the inulin is present in amounts to reduce the tendency of the polyol to induce acute diarrhea, and the effects of acute diarrhea. Preferably, the inulin is present in an amount sufficient to reduce the tendency toward acute diarrhea which is induced, at least in part, by consumption of the polyol in the absence of ingested inulin. The polyol sweetening composition desirably comprises at least one sweetening agent in which said at least one sweetening agent comprises at least one polyol, and inulin in which the sweetening agent may contain optionally other sweetening compounds.

The polyols contemplated for use in accord with the present invention are any of the polyhydric alcohols suitable for use in foodstuffs. Suitable polyols include, but are not limited to: xylitol, sorbitol, maltitol, mannitol, isomalt, isomaltitol, lactitol, hydrogenated starch hydrolysates (HSH), glycerol, propylene glycol, erythritol, galactitol, and the like, and combinations thereof. Preferably, the polyol is selected from the group consisting of xylitol, lactitol, erythritol, sorbitol, maltitol, mannitol, and combinations thereof.

More preferably, the polyol is selected from the group consisting of xylitol, lactitol, and erythritol, and combinations thereof. Still more preferably, the polyol is xylitol because of the reported health benefits of xylitol.

The inulin used in the polyol sweetening compositions embodying features of the present invention comprises polysaccharides having a variety of molecular weights. The molecular weight of inulin polysaccharides useful in the practice of the present invention is not narrowly limited, and raw inulin having inulin polysaccharides with both low and high molecular weights can be used in the sweetening compositions. Preferably, however, the inulin used in the sweetening compositions of some foods, for example, drinks, comprise the low molecular weight inulin fractions having at least about 75% by weight of polysaccharides extracted from plant materials with molecular weights of about 2288 and below. The low molecular weight inulin fractions are soluble in water at ambient temperatures making them especially suitable for water base beverages.

Alternatively, in another embodiment, the inulin used in the polyol sweetening compositions comprises high molecular weight inulin fractions in which polysaccharides having at least about 75% of molecular weights of about 2288 are present.

Fractions of inulin are readily available via extraction from chicory root using the method developed by the present inventor and fully described in U.S. Pat. No. 6,569,488, which is incorporated herein by reference, except that in the event of any inconsistent disclosure or definition, the present specification shall be controlling.

Raw inulin, or various mixtures of the high and low molecular weight inulin, are preferred in some compositions.

Inulin is added to the sweetening compositions in amounts sufficient to reduce the diarrhea induced, at least in part, by consumption of the polyol that occurs without consumption of inulin. It has been discovered that, in order to reduce diarrhea, inulin preferably comprises at least about 25% by weight of the combination of the polyol, or polyols, and inulin. Desirably, inulin comprises at least about 30% by weight of the combination of the polyol, or polyols, and inulin. More preferably, inulin comprises at least about 35% by weight of the combination of the polyol, or polyols, and inulin. Still more preferably, inulin comprises at least about 40% by weight of the combination of the polyol, or polyols, and inulin. Increasing the amount of inulin relative to the amount of the polyol, or polyols, in many cases further reduces the tendency of the polyol, or polyols, to induce diarrhea. For example, 40% by weight of inulin in the combination of inulin and polyol generally may have a better result in reducing, or eliminating, polyol induced acute diarrhea than 25% of inulin in such a polyol combination.

The polyol sweetening composition may comprise different forms. The components of the polyol sweetening composition may be granular, so that the entire composition for some uses may be granular.

Alternatively, the polyol sweetening composition may be contained in a water base medium, for example, for handling and distribution as a liquid, for instance as for use in a beverage, drink, such as sports drinks, health drinks, soft drinks, drink mixes, teas, or the like, or liquid medicines.

The sweetening compositions embodying features of the present invention may contain other sweetening agents in addition to polyols. Suitable additional sweetening agents include monosaccharides, polysaccharides (e.g. disaccharides, trisaccharides, etc.), intense sweeteners, and the like, and combinations thereof. Suitable monosaccharides include but are not limited to: glyceraldehyde, erythrose, threose, ribose, arabinose, xylose, lyxose, allose, altrose, glucose, mannose, gulose, idose, galactose, talose, dihydroxyacetone, erythrulose, ribulose, xylulose, psicose, fructose, sorbose, tagatose, and combinations thereof. Preferably, the monosaccharide is selected from the group consisting of fructose, glucose, and combinations thereof.

Suitable polysaccharides include but are not limited to disaccharides such as maltose, lactose, isomaltulose, maltulose, isomaltose, cellobiose, sucrose, and the like, and combinations thereof; trisaccharides such as raffinose; and polysaccharides containing four or more monosaccharide units such as starch, glycogen, cellulose, polydextrose, polymaltose, modified polydextrose, maltodextrins, and the like, and combinations thereof. Preferably, the polysaccharide is selected from the group consisting of disaccharides, and combinations thereof.

It has been discovered that combinations of inulin, lactose or fructose, and xylitol give a sweetness closely approximating sucrose, and for at least that reason are preferred combinations. Specific embodiments of such preferred combinations are illustrated in Examples 2 and 3 below.

Intense sweeteners also may be used in the polyol sweetening compositions embodying features of the present invention. Considerably smaller quantities of intense sweeteners are used to impart a sweet taste in the mouth, as compared to sucrose, and may be used with polyols. Intense sweeteners suitable for use in the present invention include but are not limited to: sucralose (Splenda®), aspartame (NutraSweet®), acesulfame K (Sunette®), saccharin, stevia sweeteners, neotame, glycyrrhizin, thaumatin, cyclamates, neohesperidin, dihydrochalone, alitame, and the like, and combinations thereof. Preferably, the intense sweetener is sucralose.

Sweetening compositions embodying features of the present invention can be advantageously employed in a wide variety of foodstuffs or food compositions including, but not limited to: candy (e.g., gummy, hard, etc.), chocolate, ice cream, cheese, yogurt, cottage cheese, milk, bakery products (e.g., cake, cookies, bread), frozen desserts and novelties, gelatin foods, syrups, sauces, dressings, tabletop sweeteners, beverages, medications, gum, tablets, lozenges, gel caps, and oral hygiene products. Presently preferred foodstuffs or food compositions prepared in accordance with the present invention include gum, candy, chocolate, ice cream, cheese, yogurt, cottage cheese, milk, cake, and cookies.

The compositions and food stuffs containing the combination of at least one polyol and inulin embodying the invention preferrably have a water or moisture content less than about 14% by weight. Such low water content reduces the growth of mold and bacteria. Some foods, especially those refrigerated, such as ice cream, frozen ice products, yogurt, cottage cheese, whipped toppings and desserts, gelatin products, syrups, and cheese may have a higher water contents, but are usually refrigerated. Water base drinks and beverages also have high water contents.

The drinks embodying the features of the invention include the various water base drinks, for example, soft drinks, fruit juices, rehydrating drinks, sports drinks, energy drinks, wellness drinks, teas, and the like, sweetened with at least one polyol, and inulin in sufficient amounts to at least partially reduce the diarrhea induced by said at least one polyol that occurs without the presence of inulin.

The water soluble low molecular weight inulin fractions are preferred for water base beverages. Thus, for example, a beverage sweetened with at least one sweetening agent comprising at least one polyol desirably contains the low molecular weight fractions of inulin in which at least 75% by weight of the inulin polysaccharides are extracted from plant materials that have molecular weights of 2288 and less.

The manner in which a sweetening composition embodying features of the present invention is made, and the process by which such a composition is used for the preparation of a foodstuff, will be abundantly clear to one of ordinary skill in the art based upon joint consideration of both the preceding description, and the following representative and non-limiting examples.

The following examples are given to illustrate the present invention and to assist persons skilled in the art to make and use the same. The examples are not intended in any way to limit the scope of the invention.

EXAMPLE 1

A preferred composition embodying features of the present invention is a mixture of 52% by weight of inulin powder and 48% by weight of xylitol crystals. The inulin is prefereably that sold under the name RAFTILINE® ST GEL and supplied by ORAFTI s.a. (Belgium). The xylitol is preferably that supplied by Cultor Food Science, Inc. (Ardsley, N.Y.). The mixture of inulin and xylitol is mechanically mixed (e.g., in a double coil mixer) to evenly distribute the constituents of the sweetening composition. The well-mixed sweetening composition then may be employed as a table sweetener or in a foodstuff, especially in desserts.

EXAMPLE 2

A preferred composition embodying features of the present invention is a mixture of 52% by weight of inulin and 48% by weight of the mixture of crystalline fructose and xylitol. The xylitol and fructose are present in the mixture in a weight ratio of about 1:1. The inulin is preferably that identified in Example 1. The fructose is preferably that sold under the name KRYSTAR 300 and supplied by A.E. Staley Manufacturing Co. (Decatur, Ill.). The mixture of inulin and fructose is mechanically mixed (e.g., in a double coil mixer) to evenly distribute both components of the sweetening composition. The well-mixed sweetening composition then may be employed as a table sweetener or in a foodstuff.

EXAMPLE 3

A preferred composition embodying features of the present invention, having a near zero glycemic index and providing a low caloric intake, is a mixture of 36.52% by weight of inulin, 32.22% by weight of lactose, and 31.26% by weight of xylitol. The inulin and xylitol are preferably supplied by the suppliers identified in Example 1. The lactose is preferably that supplied by Foremost Farms (Baraboo, Wis.). The mixture of inulin, lactose and xylitol is mechanically mixed (e.g., in a double coil mixer) to evenly distribute all components of the sweetening composition. The well-mixed sweetening composition then may be employed as a table sweetener or as a foodstuff.

EXAMPLE 4

A preferred composition embodying the features of the present invention is a mixture of about 75% by weight of granular erythritol and about 25% by weight of granular inulin. The inulin is identified in Example 1. The above granular mixture is suitable for sweetening candies, desserts, chocolates, and other foods.

EXAMPLE 5

A preferred composition as described in Example 4, except that the inulin is a low molecular fraction having at least about 75% of polysaccharides with molecular weight of 2288 and below. Such low molecular weight inulin is made according to U.S. Pat. No. 6,569,488. The sweetening composition is especially suitable for water base food stuffs, such as, gelatin-desserts, and beverages since the inulin is a water-soluble fraction.

EXAMPLE 6

A preferred composition embodying features of the present invention as described in Example 5, added to a water base flavored drink in amounts of about 3 grams of erythritol and 1 gram of said low molecular weight inulin fraction per 100 milliliters of a water base drink. The low molecular weight inulin is substantially soluble in the water.

EXAMPLE 7

A preferred composition embodying features of the present invention in about 1:1 weight ratio of lactitol and inulin in a chocolate candy. The lactitol:inulin combination is present in the candy in sufficient amounts to impart the desired sweetness to the candy.

EXAMPLE 8

A preferred water base lime drink embodying the features of the present invention is made by mixing about 42 grams of granular erythritol with about 14 grams of inulin. The granular mixture is added to 6 fl. oz. of water and stirred. About 0.5 fl. oz. of lime juice concentrate is added to the water base mixture, and stirred. More water is added to make a 10 fl. oz. drink, and cooled. Flavors other than lime may be substituted for the lime juice. The granular inulin is identified in Example 1.

EXAMPLE 9

A preferred granular composition embodying the features of the present invention is a mixture of 27 grams of granular inulin, and 27 grams of granular xylitol. The inulin is identified in Example 1.

EXAMPLE 10

(Recipe for Carrot Cake)

½ cup inulin; /1;4 cup fructose (alternatively, lactose); ¼ cup xylitol; 1 tablespoon lactose; ½ cup oil; 2 eggs beaten; 1½ cups grated carrots; 1 cup unsifted flour; ½ teaspoon salt; 1 teaspoon baking soda; 1 teaspoon cinnamon; ½ cup each ground coconut, nuts, raisins.

Combine inulin, fructose, xylitol, lactose and oil. Add eggs. Mix well. Add grated carrots. Slowly stir in sifted dry ingredients. Add ground coconut, nuts and raisins. Pour batter into lightly greased and floured 9"×9" square cake pan. Bake at 400 degrees Fahrenheit for 20 to 30 minutes, or until done.

By comparison with a cake prepared using 1 cup sugar, the cake prepared according to this recipe with a polyol sweetening composition containing inulin, fructose and xylitol has a somewhat denser texture.

EXAMPLE 11

(Recipe for Orange Sponge Cake)

8 eggs, separated; ¼ teaspoon salt; 1 teaspoon cream of tartar; 1 cup polyol sweetening composition (⅔ cup inulin, ⅓ cup xylitol, ⅓ cup lactose); grated rind from one orange; ¼ cup orange juice; 1 cup, plus 2 tablespoons flour; sifted ½ cup almonds; blanched and toasted; 1 cup cream whipped.

Beat egg whites and salt until foamy. Add cream of tartar and beat until stiff, not dry. Gradually add ⅔ cup polyol sweetening composition, beating after each addition. Beat egg yolks until very thick and lemon colored. Add remaining ⅔ cup polyol sweetening composition, orange rind and juice. Fold the two mixtures together and fold in flour. Bake for one hour in an ungreased 10" angel food cake pan at 325 degrees Fahrenheit. Remove from oven and invert for one hour. Chop almonds coarsely. Spread whipped cream on cake and sprinkle with almonds.

By comparison with a cake prepared using 1⅓ cups sugar, the cake prepared according to this recipe with a polyol sweetening composition containing inulin, xylitol and lactose has a denser texture, does not rise as high, may cook more rapidly, and is slightly less sweet (although very palatable nonetheless).

EXAMPLE 12

(Recipe for Angel Food Cake)

1 cup sifted cake flour; ¾ cup polyol sweetening composition (2 parts inulin, 1 part xylitol, 1 part lactose); 1½ cups (12) egg whites; 1½ teaspoons cream of tartar; ¼ teaspoon salt; 1½ teaspoons vanilla; ¾ cup polyol sweetening composition (2 parts inulin, 1 part xylitol, 1 part lactose).

Sift flour with ¾ cup polyol sweetening composition 4 times. Beat egg whites with cream of tartar, salt, and vanilla until stiff enough to form soft peaks while remaining moist and glossy. Add the remaining ¾ cup polyol sweetening composition, 2 tablespoons at a time, continuing to beat until meringue holds stiff peaks. Sift about ¼ of flour mixture over white. Fold in remaining flour by fourths. Bake in ungreased 10" tube pan in moderate oven (375 degrees Fahrenheit) 35 to 40 minutes or until done. Invert pan and let cake cool.

EXAMPLE 13

(Recipe for Feather Sponge Cake)

6 egg yolks; ½ cup cold water; 1½ cups polyol sweetening composition (2 parts inulin, 1 part lactose, 1 part xylitol); ½ teaspoon vanilla; ½ teaspoon orange or lemon extract; 1½ cups sifted cake flour; ¼ teaspoon salt; 6 egg whites; ¾ teaspoon cream of tartar.

Beat egg yolks until thick and lemon-colored. Add water. Continue beating until very thick. Gradually beat in polyol sweetening composition, then vanilla and orange extract. Sift flour with salt. Fold into egg-yolk mixture a little at a time.

Beat egg whites with cream of tartar until stiff peaks form. Fold into first mixture, turning bowl gradually.

Bake in ungreased 10" tube pan in slow oven (325 degrees Fahrenheit) for about 1 hour. Invert pan to cool. Swirl with fluffy frosting, or slice and serve with fresh fruit or ice cream.

The following Examples 12–14 are tests showing the effects of inulin in reducing, or eliminating, diarrhea.

EXAMPLE 14

(Human Tests of Erythritol and Erythritol with Inulin)

The subject was a male with a body weight of about 75 kg. His normal diet includes two tablespoons of inulin, containing about twenty-one grams of inulin, taken in the morning with breakfast.

During Stage 1: over a period of 6 days, he took no inulin.

During Stage 2: on the sixth day, he took 52 grams total of granular erythritol and dissolved the erythritol in a cup of hot water and drank the combination. He took no inulin this day as on the previous four days.

Taking 52 grams of erythritol produced two normal bowel movements, "the same as before the test," one six hours later and one seven hours later. One bowel movement usually would have come sixteen hours later without ingesting erythritol.

During Stage 3: on the seventh day, he took 104 grams total of granular erythritol and dissolved the erythritol in two cups of hot water and drank the two cups. He took no inulin this day.

Taking 104 grams of erythritol produced four abnormal bowel movements with "some liquid with solids" between nearly twenty hours to twenty-three hours after ingestion of the erythritol. After twenty-four and a half hours he had a fifth bowel movement "softer than usual." Then from forty-five to forty-seven hours after ingestion of the 104 grams of erythritol "severe diarrhea-explosive" set in four times.

During Stage 4: on day 9, at 12:05 p.m., he took 104 grams total of granular erythritol with 10.4 grams of inulin and dissolved the erythritol and inulin in two cups of hot water and drank the two cups.

Taking the 104 grams of erythritol and 10.4 grams of inulin produced "severe diarrhea-explosive" five times from six to ten hours after ingestion. He then went to bed and was awakened five- and one-half hours later with a sixth "severe diarrhea-explosive" attack.

During Stage 5: on day 10, at 4:00 a.m., he took 25 grams of inulin and dissolved the inulin in one cup of hot water and drank it.

Taking 25 grams of inulin stopped the "severe diarrhea-explosive." Five hours later he had one bowel movement "softer than usual." After that he had five very small bowel movements "the same as usual.

Protocol: throughout the trials, he ate soft foods, as he had a tooth extracted and much infected bone removed from his lower right jaw.

Subject's Observation: on the package label there is a statement: "ERYTHRITOL is a safe sugar substitute that is safer than aspartame and saccharin and tastes better and is easier to use than stevia or many other sugar substitutes widely available to day! Eythritol [sic] does not have the laxative effect of most of the sugar alcohols on the market and Erythritol . . . "

Subject's Conclusion 1: Erythritol taken between meals at a dose of 0.796 gms of erythritol to the kilogram weight of the consuming subject produces no diarrhea but three times the usual number of bowel movements.

Subject's Conclusion 2: Erythritol taken between meals at a dose 1.591 gms of erythritol to the kilogram weight of the consuming subject produces moderate diarrhea with "some liquid with solids" and then "severe diarrhea-explosive" over the next two days.

Subject's Conclusion 3: inulin at 10% the amount of erythritol taken together between meals at a dose 1.591 gms of erythritol to the kilogram weight of the consuming subject does not stop "severe diarrhea-explosive" caused by the erythritol.

Subject's Conclusion 4: inulin at 25% the amount of erythritol taken previously between meals at a dose 1.591 gms of erythritol to the kilogram weight of the consuming subject stops "severe diarrhea-explosive" caused by the erythritol.

EXAMPLE 15

(Human Tests of Lactitol and Lactitol with Inulin)

The subject was a female having a body weight of about 70 kilograms. Her normal diet includes about seven grams of inulin, taken in the morning with breakfast.

During Stage 1: for four days at about 10 a.m., she ate five pieces of sugar-free candy of a well-known brand purchased at a retail store (40 g). The label said that a five-piece serving size contains 21 grams of lactitol. She continued taking her normal seven grams of inulin.

Eating this candy caused her to feel dull in her thinking and uneasy in the stomach for about two hours. She felt pressure in the bowels in the afternoon but had no explosions or watery stools. She completed the four-day trial with no diarrhea.

During Stage 2: she went five days eating no candy and taking no inulin to purge her system of both inulin and lactitol.

During Stage 3: for the next four days at about 10 a.m., she ate five pieces of the same candy (40 g) containing 21 grams of lactitol. She did not take her regular dose of inulin.

Eating this candy again caused her to feel dull in her thinking and uneasy in the stomach for three to four hours. At about 11 a.m. and again after lunch, she felt the need to lie down and sleep. About noon, she felt pressure in the bowels and suffered attacks of explosive gas and watery emissions. The diarrhea was most severe the first day, coming in two waves through the afternoon.

On the three subsequent days, she had attacks of diarrhea two to three hours after eating the candy along with the same dullness in her head and weight in her stomach and abdomen.

Throughout the trial, she maintained normal eating patterns: a breakfast with cracked wheat cereal containing fiber, plus toast and juice; a lunch with fruit, vegetables and fish or small serving of meat; a lighter dinner with pasta or salads.

Subject's Observation 1: "I was very pleased to stop eating the candy because it detoured me from my work, slowed my productivity, and caused discomfort and diarrhea. While taking inulin with the lactitol, I experienced much less gas and pressure in the abdomen than with the lactitol alone and I had no diarrhea when the inulin was paired with the candy."

Subject's Observation 2: "The day following the tests, when I was taking my usual two tablespoons of inulin again, bowel movements returned to their normal soft, firm state, and my thinking and energy level were high."

EXAMPLE 16

(Human Tests of Lactitol and Lactitol with Inulin)

The subject was a male. His body weight was about 75 kilograms. His normal diet includes two tablespoons of inulin, containing about twenty-one grams of inulin, taken in the morning with breakfast.

During Stage 1: for four days, he took no inulin.

During Stage 2: at 10:30 a.m. on day 5, he ate ten pieces of sugar-free candy of a well-known brand purchased at a retail store (78 grams total, containing 38 grams of lactitol). The label said that a five-piece serving size of 39 grams contains 19 grams of lactitol. He took no inulin this day.

Eating this candy produced six bouts of severe and explosive diarrhea, beginning three-and-a-half hours later, with the volume decreasing each time but the severity remaining the same.

During Stage 3: the next day, the day 6, he ate ten pieces of the same candy (78 grams total, containing 38 grams of lactitol). This day he also took 19 grams of inulin for a 2:1 ratio of lactitol to inulin.

Eating candy with lactitol and also inulin in a 2:1 ratio produced only gas the first, fifth, and sixth times after feeling the need of elimination. The second time produced gas and a softer than usual bowel movement in a small amount. The third and fourth times produced some liquid with the soft solids in a small amount. After two times of gas only, the seventh time produced a pronounced diarrhea in a small amount without explosion.

During Stage 4: on day 7, at about 10:30 a.m., he ate ten pieces of the same candy (78 grams total, containing 38 grams of lactitol). This day he also took 38 grams of inulin for a 1:1 ratio of lactitol to inulin.

Eating candy with lactitol and also inulin in a 1:1 ratio produced gas the first, second, and fourth times of feeling the need of elimination. On this day, about fours hours after eating the candy, he had a softer than usual bowel movement in a quantity less than a third of normal.

Protocol: throughout the trials, he maintained normal eating patterns: a breakfast with cracked wheat cereal containing fiber, plus toast and juice, a half grapefruit and banana with peanut butter; a lunch with fruit, vegetables and fish or small serving of meat; a lighter dinner with soup, salad, and whole-wheat bread.

Subject's Observation: "On all days during the trials, I had a normal bowel movement each morning upon arising. The volume in the bowel movement on the sixth day was less than half of normal. Eating lactitol mid-morning affected me in the afternoon decreasingly on the sixth and seventh day as I increased the intake of inulin taken with the lactitol. The diarrhea of the fifth and sixth days did not seem to carry over in affecting the quality of the bowel movement of the next morning."

Subject's Conclusion 1: "Taking double the recommended serving of the same candy (a confection in which lactitol replaced sugar) confirmed the warning on the package: 'Excess consumption may have a laxative effect.' In Stage 2, 38 grams of lactitol produced severe diarrhea and explosive output six times within the next five hours." (Emphasis by subject)

Subject's Conclusion 2: "Taking double the recommended serving of the same candy balanced by grams of inulin in a 1:2 ratio to that of lactitol resulted in some diarrhea in Stage 3." (Emphasis by subject)

Subject's Conclusion 3: "In Stage 4, taking double the recommended serving of the same candy balanced by grams of inulin in a 1:1 ratio to that of lactitol in the candy resulted in no diarrhea and one slightly softer stool less than one-third the usual in volume." (Emphasis by subject)

EXAMPLE 17

(Human Tests of Xylitol and Xylitol with Inulin)

Protocol for the Human Study. Fifteen subjects, randomly separated into two groups (1 and 2), participated in the entire trial, which lasted for six weeks divided into three successive periods: 1) a two week treatment period, during which the volunteers were instructed to consume their normal diet while adding a sachet of treatment to their breakfast (group 1 taking treatment A, group 2 taking treatment B); 2) a two week washout period, during which both groups continued with their normal diets without taking either treatment; 3) a two week treatment period, during which the volunteers continued their normal diets, this time taking the treatment they had not previously received (group 1 taking treatment B, group 2 taking treatment A), with their breakfast.

Product Identification. Product (treatment) A consisted of 7 grams of xylitol. Product (treatment) B consisted of 7 grams of xylitol blended with 7 grams of inulin.

Sample Collection. Total stool collections were taken for three days at the end of each of the three periods. Collections were made in two-gallon freezer bags, to which an Ageless Z group (Mitsubishi Gas Chemical Company) oxygen absorber packet was added and sealed. Stools were collected and processed the following day.

During the three-day collection of each period, volunteers were required to keep a 24-hr dietary recall, as well as take their own blood glucose reading before breakfast and again one hour after. In addition, subjects were required to fill out a symptom diary each day providing information about possible changes in number of bowel movements, frequency of stools, quality of stools, and flatulence. Fasting blood draws were also taken the last day of each period, and lipid panels were run.

Protocol for analyses of stools. Stools were collected and weighed for daily totals. Samples were then stomached for 60 seconds, and then three 2–10 g samples were then taken and dried overnight to determine percent moisture of each stool. Samples were then stomached again with an additional 1 fold dilution of 0.9% saline solution, after which a ph reading was taken. Serial dilutions were then prepared with the saline solution, and 1.0 ml samples were inoculated onto agar medium specific for the growth of *Lactobacilli* (Rogosa SL, Difco), Bifidobacteria (Beerens), *E. Coli* (MacConkey), and *Candida Albicans* (Sabouraud Dextrose Agar). *Lactobacilli* and Bifidobacteria were incubated anaerobicaly (BBL GasPak Plus) at 37 C for three days. *E. Coli* and *C. Albicans* were incubated aerobically at 37 C for 24 hrs and 48 hrs respectively. Bacteria were characterized to genus level on the basis of colony appearance, Gram staining, and cell morphology.

Results and Discussion. Diarrhea/Constipation. Participants reported a slightly softer stool with treatment A, while treatment B caused a more firmness at first, but then became more normal.

When looking at the average per person per week, regardless of when taken, treatment A (xylitol without inulin) was associated with an increase in diarrhea from the first week to the second. See, Drawing FIG. 1. Treatment B (xylitol with inulin), however, tended to produce more constipation the first week which lessened the following week. See, Drawing FIG. 2.

In the Drawing FIG. 1, 1="very little more diarrhea;" 2="mildly more diarrhea." (n=15)

Figure 2:
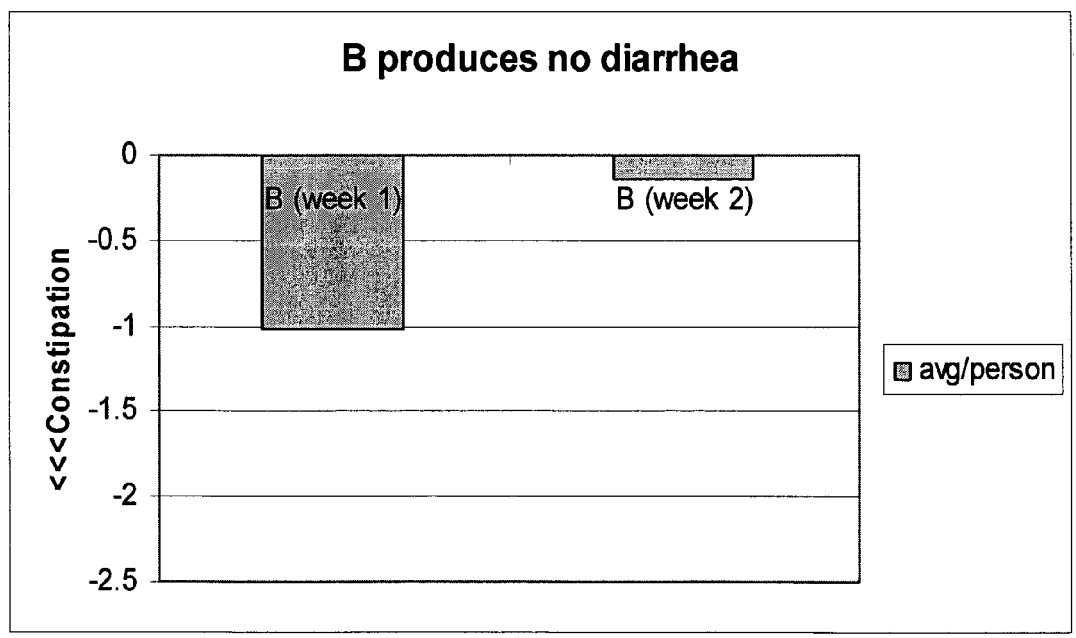
FIG. 2 is a graph illustrating the results of the human tests reported in Example 17 of ingesting the polyol xylitol with inulin.

In the Drawing FIG. 2, 1="very little more constipation;" 2="mildly more constipation." (n=15)

Fermentation. Fermentation would be indicated by a decrease in stool pH as well as an increase in flatulence due to the production of short chain fatty acids (SCFA) and gases in the lower intestines. The average stool pH of treatments A and B were 6.3±0.76 and 6.2±0.54 respectively, compared to a washout stool pH of 6.8+0.63; indicating an increase in acidity. When looking at flatulence, treatment B averaged a two fold increase from normal compared to treatment A (graph 1).

In the results of our bacterial analysis, every participant in treatment B had an increase in number of Bifidobacteria from their washout period. Bacterial counts varied so widely between individuals that it was not feasible to provide numbers or charts. Four of the six people on treatment A showed an increase in Bifidobacteria as well, but there were two who showed a decrease from their washout to A.

The testing in Example 17 of the combination of polyol and inulin had several unexpected results; the tendency of the polyol and inulin combination to reduce diarrhea and the effects of diarrhea; the increase in the stool mass; and the decrease in the pH of the stool. All of the foregoing are desirable health benefits.

When analyzing actual samples however, average moisture levels between Treatments A and B remained quite similar with 74%±13 and 77%±5 respectively. Treatment B was slightly higher than the average at washout, 74%±6. In general those on Treatment B had a larger average total stool mass (175.25±95 g) to those on Treatment A (159.39±114 g).

EXAMPLE 18

(Human Test of Erythritol and Erythritol with Inulin)

The subject was male. A normal diet preceding and during the test was followed. The subject, previously taking inulin, stopped for seven days preceding the test.

Day 1. The test started with drinking a lime flavored drink using 54 grams of erythritol as the sweetener. The amount of erythritol was determined by the body weight of the subject, 74.5 Kilograms, multiplied by 0.66, the limit of erythritol for men without "causing diarrhea," (See, Table 2), and again multiplied by 1.10, to have the intake of erythritol 10% over the limit "causing diarrhea" for the individual. The sample was taken midway between breakfast and lunch. No other "snack food" was taken.

After drinking the erythritol observations were made for the day by the participant. Subject had his normal one per day bowel movement (BM) at 5:30 am at the normal volume.

Five (5) BM's resulted from three hours to nineteen hours after taking the drink all in the 2 category, "Some liquid with solids." Subject was awakened once in the night.

Physical Description: "Abdominal discomfort, flatulence, nausea upon drinking sample."

Day 2: 54 grams of erythritol, lime flavored, drunk between breakfast and lunch.

Eight (8) BM's resulted from four hours to twenty-three hours plus (23:45) after taking drink all in the 2 category, "Some liquid with solids." Subject was awakened once in the night.

Physical Description: "Abdominal discomfort, flatulence, no nausea upon drinking sample."

Day 3: 54 grams of erythritol, lime flavored, drunk between breakfast and lunch.

Eight (8) BM's resulted from three hours to twenty-seven hours plus (27:20) after taking drink all in the 2 category, "Some liquid with solids." Subject was awakened once in the night.

Physical Description: "Abdominal discomfort, flatulence, no nausea upon drinking sample."

Day 4: 54 grams of erythritol with 19 grams of inulin in lime flavored drink drunk between breakfast and lunch.

One (1) BM's resulted twenty-three hours plus (23:30) after taking drink in the 0 category, "the same as before test."

Physical Description: "No discomfort, no flatulence, sample upon drinking was tastier with more enjoyable lime flavor."

Conclusion 1: "erythritol when taken at 0.72 grams to kilograms of body weight produces distinct and uncomfortable diarrhea and frequent uncontrolled bowel movements."

Conclusion 2: "the body of subject did not adapt over three days to the same daily erythritol intake."

Conclusion 3: "inulin at 26% added to erythritol taken at 0.72 grams to kilograms of body weight immediately stops the diarrhea caused by taking erythritol alone."

EXAMPLE 19

(Human Test of Erythritol and Erythritol with Inulin)

The weight in grams of erythritol to the body weight in kilograms so as not to produce diarrhea has been reported by others to be 0.66 for males and 0.80 for females (See, Table 2, below). The following human tests demonstrate that diarrhea is induced by the ingestion of erythritol above those reported amounts, without ingestion of inulin. However, upon adding inulin to the composition containing the same amount of erythritol, diarrhea decreases, or stops, when it is ingested in an amount of about 26% of the combination of inulin and erythritol.

Protocol for the Human Study. Five students in a Masters program of nutrition in a United States university volunteered to participate in a "SWEETENER TEST." Normal diet preceding and during the tests was encouraged. Test subject 101 did not keep on a normal diet so was dropped. The subjects had not previously taken inulin or erythritol.

Body weight and sex of each participant was noted, and the dosage amount of erythritol was prepared on the amount set forth in Table 2, below, plus 10% more erythritol, so that each participant took 10% above the reported tolerable level of erythritol.

Samples were prepared previously by taking six (6) fluid ounces of boiled water, mixing in for Day 1 a weighed amount of erythritol based on the body weight of the participant times certain factors, and then dissolved in the hot water. For Day 2 the same amount of erythritol was mixed with a percentage by weight of inulin (ORAFTI Raftiline ST-Gel) and dissolved in another six (6) fluid ounces of water. Then five-tenths (0.5) of a fluid ounce of Eagle Family Foods REALIME Lime Juice was added to the mixture. The resulting liquids were put in ten fluid ounce bottles, boiled water added to bring to 10 fluid ounces, pasteurized, sealed by vacuum, and labeled for each individual.

Two bottles each along with three sheets of paper were distributed to each participant. Each was requested to make observations of frequency and characteristics of bowel movements (BM's) by time and to record their physical feelings for the two days of ingestion plus the subsequent day.

Each participant was instructed to take the designated sample midway between breakfast and lunch and to note the time.

Subject U-1.

Day 1: Male subject drank 53 grams of erythritol to his body weight of 72.7 Kilograms. 0.66, the limit of erythritol for men without "causing diarrhea," was multiplied by 1.10 to have the intake of erythritol 10% over the limit "causing diarrhea" for subject.

After drinking the Erythritol three (3) BM's resulted from fourteen (14) hours, midnight, to twenty-two hours (22) after taking the drink. The first one was in the 3 category, "More liquid than solids." The next two were in the 1 category, "Softer than usual." Subject was awakened from sleep with diarrhea at midnight when the first bout came.

Physical Description: "Painful gas in abdomen, general feeling of malaise & nausea."

Day 2: 17.5 grams of inulin at 33% of the erythritol were taken with 53 grams of erythritol.

Two (2) BM's resulted at two (2) hours and nine (9) hours after taking the drink. It was in the 0 category, "The same as before the test." Subject slept well.

Physical Description: "Felt good and more energized than usual on this day after drinking sample."

Day 3: No sample taken.

No BM's resulted on this day.

Physical Description: "Felt cleansed and continued more energized than usual."

Conclusion 1: Erythritol when taken at 0.73 grams to kilograms of body weight by this man produced uncontrollable and uncomfortable diarrhea and more frequent soft bowel movements thereafter.

Conclusion 2: The body of subject adapted during the day to erythritol intake. The severity of diarrhea decreased from the first to the last two bouts.

Conclusion 3: Inulin at 33% of the erythritol (or 25% of total sample) added to erythritol taken at 0.73 grams to kilograms of body weight for this man immediately stopped the uncomfortable and persistent diarrhea caused by taking erythritol alone.

Conclusion 4: Inulin added to erythritol was judged by this man to give him extra energy.

Subject U-2.

Day 1: Female subject drank 42 grams of erythritol to her body weight of 47.7 Kilograms. 0.80, the limit of erythritol for women without "causing diarrhea," was multiplied by 1.10, to have the intake of erythritol 10% over the limit "causing diarrhea" for subject.

After drinking the erythritol two (2) BM's resulted at eighteen (18) hours and twenty-six (26) hours. The first was the 0 category, "The same as before test." The next was in the 1 category, "Softer than usual."

Physical Description: "Increased flatulence, feeling of nausea lasting 4 hours."

Day 2: 14 grams of Inulin at 33% of the erythritol were taken with 42 grams of erythritol.

One (1) BM resulted at twenty three (23) hours after taking the drink. It was in the 0 category, "The same as before test."

Physical Description: "Continued flatulence."

Day 3: No sample taken.

One (1) BM resulted. It was in the 0 category, "The same as before test."

Physical Description: "No symptoms."

Conclusion 1: Erythritol when taken at 0.88 grams to kilograms of body weight by a woman produced flatulence, feeling of nausea for four hours, and one more bowel movement than usual, the second being softer than usual.

Conclusion 2: Inulin at 33% of the erythritol (or 25% of total sample) added to erythritol taken at 0.88 grams to kilograms of body weight for a woman stopped the softness of stool caused by taking erythritol alone.

Subject U-3.

Day 1: Male subject drank 53 grams of erythritol to his body weight of 80.9 Kilograms. 0.66, the limit of erythritol for men without "causing diarrhea," was multiplied by 0.99 to have the intake of erythritol 10% below the limit "causing diarrhea" for subject.

After drinking the erythritol three (3) BM's resulted from three (3) hours to nearly twenty-five (24:50) hours after taking the drink. The first and third were in the 3 category, "More liquid than solids." The second was in the 1 category, "Softer than usual."

Physical Description: "Rumbling in abdomen, got mild headache, drink was too sweet."

Day 2: 17.5 grams of inulin at 32% of the erythritol were taken with 53 grams of erythritol.

Three (3) BM's resulted between twenty (20) hours and twenty-four and one-half (24:30) hours after taking the drink. All three were in the 0 category, "The same as before the test."

Physical Description: "Headache continued, then decreased after taking drink, still too sweet."

Day 3: No sample taken.

One BM resulted on this day at 1800 hours in the 0 category, "The same as before the test."

Physical Description: "No headache, some residual gas."

Conclusion 1: Erythritol when taken at 0.65 grams to kilograms of body weight by this man produced two bouts of uncontrollable and uncomfortable diarrhea and, in between, a soft bowel movement.

Conclusion 2: The body of subject did not adapt during the day to erythritol intake. The severity of diarrhea decreased in the second bout from the first but then increased in the third bout back to the severity of the first.

Conclusion 3: Inulin at 32% of the erythritol (or 24% of total sample) added to erythritol taken at 0.65 grams to kilograms of body weight for this man immediately stopped the uncomfortable diarrhea caused by taking erythritol alone.

Conclusion 4: Inulin taken on the second day seemed to help the subject return fully to bowel normality on the third day.

Subject U-4.

Day 1: Female subject drank 42 grams of erythritol to her body weight of 47.7 Kilograms. 0.80, the limit of erythritol for women without "causing diarrhea," was multiplied by 1.10, to have the intake of erythritol 10% over the limit "causing diarrhea" for subject.

After drinking the erythritol six (6) BM's resulted from two (2) hours to twenty-seven (27:20) hours after taking the drink. The first four were in the 3 category, "More liquid than solids." The next two were in the 2 category, "Some liquid with solids." Subject was awakened from sleep with diarrhea at 4:54 am.

Physical Description: "Abdominal cramping, bloating, a little nausea upon drinking sample."

Day 2: 14 grams of inulin at 33% of the erythritol were taken with 42 grams of erythritol in a lime flavored drink between breakfast and lunch.

One (1) BM resulted at eight and one-half hours (8:30) after taking the drink. It was in the 1 category, "Softer than usual." Subject slept well.

Physical Description: "Somewhat bloated for first part of day after drinking sample."

Day 3: No sample taken.

No BM's resulted on this day.

Physical Description: "No other symptoms."

Conclusion 1-1: Erythritol when taken at 0.88 grams to kilograms of body weight produces distinct and uncomfortable diarrhea and frequent uncontrolled bowel movements.

Conclusion 2: The body of subject adapted slightly during the day to erythritol intake. The severity of diarrhea decreased in the last two from the first four bouts.

Conclusion 3: Inulin at 33% of the erythritol added to erythritol taken at 0.88 grams to kilograms of body weight for a woman immediately stops the uncomfortable and persistent diarrhea caused by taking erythritol alone.

Conclusion 4: Inulin taken on the second day seemed to help the subject to continue to avoid diarrhea on the third day.

The Examples 1–19, above, demonstrate that inulin tends to reduce, or eliminate, polyol induced acute diarrhea at least in the amounts set forth in the claims.

A report by Japanese investigators estimated the maximum dose level of different polyols that did not cause Taxation. Oku et al., Digestion, absorption, fermentation and metabolism of functional sugar substitutes and their available energy, PURE AND APPLIED CHEMISTRY, Vol. 74, No. 7, 1260, 1253–1281 (2002). A pertinent portion of the paper is reproduced in Table 2, below:

TABLE 2

Maximum permissible dose of certain polyols not causing transitory diarrhea.

| Sugar Substitutes | Maximum Permissible Dose (g/kg body wt) | |
|---|---|---|
| | Male | Female |
| Erythritol | 0.66 | 0.80 |
| Xylitol | — | 0.7 |
| Sorbitol | 0.17 | 0.24 |
| | 0.15 | 0.3 |
| Maltitol | — | 0.30 |
| | 0.3 | 0.3 |
| Lactitol | — | 0.37 |

Referring to Table 2, the estimated maximum tolerable amount of polyol (without inulin) not causing Taxation is reported above to be about 0.17 grams (for males) and 0.24 grams (for females) per one kilogram body weight for sorbitol, about 0.7 grams (for females) per one kilogram body weight for xylitol, about 0.30 grams per one kilogram body weight for maltitol, and about 0.66 grams (for male) and 0.80 grams (for female) per one kilogram body weight for erythritol.

As indicated above, the estimated maximum tolerable dose that does not cause Taxation without inulin depends upon the particular polyol consumed, the body weight of subject, and the gender of the subject. Other tolerance factors may include the mode of ingestion, the provision of a prior adaptation time, and individual susceptibility. Therefore, it is to be understood that the estimated maximum tolerable dosages in Table 2 are only indicative of general tolerable limits, and that specific thresholds may depend upon other conditions. Nevertheless, Table 2 indicates average general upper tolerable limits from about 0.15 to about 0.80 grams per one kilogram body weight for the various polyols tested without inulin, and confirms that there are upper limits to the amounts of polyols that can be used in foods without inducing acute diarrhea.

Moreover, in designing food products containing polyols, the manufacturer desirably should provide a margin of safety to insure against Taxation. Thus, while Table 2 reports the estimated maximum tolerable dose for certain polyols without inulin, a desirable margin of safety against inducing acute diarrhea may need to be considered also. In any case, the use of inulin in food products according to the present invention provides food manufacturers with more flexibility in designing the amounts of polyol in foods, and in minimizing, or preventing, acute diarrhea caused by polyols, than without using inulin.

While neither desiring to be bound by any particular theory, nor intending to affect in any measure the scope of the appended claims, the applicant presently believes that the induction of acute diarrhea caused by consumption of polyols stems from the inability of the stomach and small intestine to metabolize all of the polyol, thereby resulting in passage of all, or part, of the polyol into the large intestine. In the large intestine, the polyol increases the water content through osmosis, which causes acute diarrhea. As a result, large servings of polyol induce diarrhea, or symptoms of acute diarrhea.

It is believed that inulin resists the digestive enzymes and serves as a ready source of fermentable fiber that enhances the rapid growth of Bifidobacteria. The *Bifidobacteria* metabolizes or break down any polyols so that they can be readily absorbed in the large intestine.

Again, while not desiring to be bound by any theory, the gastrointestinal tract is populated by beneficial and harmful bacteria. The beneficial bacteria are, for example, *Bifidobacteria* and *Lactobacillus*. The clearly harmful bacteria include *Hellicobacter pyolyi, Clasteidium perfringens* and *Salmonella*. The unexpectedly lower pH (more acidity) 6.2 resulting from the ingestion of polyol and inulin (See, Example 15, Fermentation) tends to reduce the harmful bacteria.

Also, the larger stool mass resulting from ingesting the polyol and inulin (See, Example 15, Fermentation) increases the large intestine's motility and decreases the transit time. This maintains healthy intestinal functions, and mass reduces potential harmful effects resulting from long dwell times of potentially harmful substances, such as other potentially carcinogenic materials in the intestinal tract. This is still another unexpected intestinal health benefit.

The foregoing description and examples are provided by way of explanation and illustration, and are not intended to limit the scope of the following claims. Variations in the manner of making and using the presently preferred embodiments will be obvious to persons of ordinary skill in the art, and remain within the scope of the claims.

The invention claimed is:

1. A composition containing at least one polyol having a reduced tendency of said composition upon consumption to induce acute diarrhea, comprising:
   at least one sweetening agent,
   said at least one sweetening agent comprising at least one polyol; and
   inulin,
   said composition containing sufficient amounts of inulin to at least partially reduce the tendency of the polyol to induce acute diarrhea upon consumption;
   said inulin comprising at least about 25% by weight of the combination of said at least one polyol and said inulin,
   said composition containing less than about 14% by weight of water.

2. The composition of claim 1, wherein said at least one polyol is selected from the group consisting of xylitol, sorbitol, maltitol, mannitol, isomalt, isomaltitol, lactitol, hydrogenated starch hydrolysates, glycerol, propylene glycol, erythritol, galactitol, and combinations thereof.

3. The composition of claim 1, wherein said at least one polyol is selected from the group consisting of xylitol, sorbitol, maltitol, mannitol, lactitol, erythritol, and combinations thereof.

4. The composition of claim 1, wherein said at least one polyol is selected from the group consisting of xylitol, sorbitol, lactitol, erythritol, and combinations thereof.

5. The composition of claim 1, wherein said at least one polyol comprises xylitol.

6. The composition of claim 1 in which said at least one polyol comprises lactitol.

7. The composition of claim 1 in which said at least one polyol comprises erythritol.

8. The composition of claim 1 in which said at least one polyol comprises maltitol.

9. The composition of any one of claims 1 to 8, wherein said inulin comprises at least about 30% by weight of the combination of said at least one polyol and said inulin.

10. The composition of any one of claims 1 to 8, wherein said inulin comprises at least about 35% by weight of the combination of said at least one polyol and said inulin.

11. The composition of any one of claims 1 to 8, wherein said inulin comprises at least about 40% by weight of the combination of said at least one polyol and said inulin.

12. A foodstuff comprising a sweetening composition as recited in any one of claims 1 to 8.

13. The composition of any one of claims 1 to 8, wherein said sweetening agent further comprises at least one intense sweetener.

14. The composition of any one of claims 1 to 8 in which said sweetening agent further comprises sucralose.

15. A beverage comprising:
   a sweetening agent comprising at least one polyol; and
   low molecular weight fractions of inulin;
   said low molecular weight fractions of inulin present in sufficient amounts to reduce the tendency of said at least one polyol to induce acute diarrhea when said at least one polyol is consumed in amounts sufficient to cause diarrhea in the absence of inulin.

16. The beverage of claim 15 in which said at least one polyol is selected from the group consisting of erythritol, xylitol, and combinations thereof.

17. The beverage of claim 15 in which said inulin is in amounts of at least about 25% by weight of the at least one polyol and inulin.

18. The beverage of claim 15 in which said inulin is in amounts of at least about 30% by weight of the at least one polyol and inulin.

19. The beverage of claim 15 in which said inulin is in amounts of at least about 35% by weight of the at least one polyol and inulin.

20. A method for preparing a foodstuff having a plurality of ingredients, including at least one polyol which has a tendency to induce acute diarrhea upon consumption said method comprising:
   (a) combining a first of said ingredients with at least one polyol;
   (b) combining a second of said ingredients with inulin, said inulin present in said second ingredients in amounts sufficient to reduce the tendency of said at least one polyol to induce acute diarrhea upon consumption, and in amounts at least 25% by weight of said inulin to the combination of said at least one polyol and inulin in the foodstuff; and
   (c) admixing the combination of the first ingredient and polyol with the combination of the second ingredient and inulin.

21. The method of claim 20, wherein said foodstuff is candy, chocolate, ice cream, cake, cookies or a beverage.

22. A method for preparing a foodstuff containing at least one polyol which has a reduced tendency to cause acute diarrhea upon consumption, said method comprising:
adding to said foodstuff:
(i) at least one polyol; and
(ii) inulin in amounts sufficient to reduce the tendency of said polyol to induce acute diarrhea and in amounts of at least about 25% by weight of the combination of said at least one polyol and said inulin in the foodstuff; wherein
said at least one polyol and said inulin are added to said foodstuff either in combination or in separate portions at different times.

23. The method of claim 22, wherein said foodstuff is selected from the group consisting of candy, chocolate, ice cream, cheese, cottage cheese, milk, cake, cookies and beverages.

24. The method of claim 22 further characterized in that said inulin comprises at least about 40% by weight of said at least one polyol and inulin.

25. A food composition containing at least one polyol characterized by a reduced tendency of the polyol upon consumption to induce acute diarrhea, comprising:
at least one polyol;
said at least one polyol comprising xylitol;
inulin;
said composition containing sufficient amounts of inulin to at least partially reduce the tendency of the polyol to induce acute diarrhea upon consumption;
said inulin comprising at least about 25% by weight of said at least one polyol and inulin;
said food composition containing less than about 14% by weight of water.

26. The food composition of claim 25 in which said inulin is present in amounts of at least about 30% by weight of said at least one polyol and inulin.

27. The food composition of claim 25 in which said inulin is present in amounts of at least about 40% by weight of said at least one polyol and inulin.

28. A food composition containing at least one polyol characterized by a reduced tendency of the polyol upon consumption to induce acute diarrhea, comprising:
at least one polyol;
said at least one polyol comprising lactitol;
inulin;
said composition containing sufficient amounts of inulin to at least partially reduce the tendency of the said at least one polyol to induce acute diarrhea upon consumption;
said inulin comprising at least about 25% by weight of said at least one polyol and inulin.

29. The food composition of claim 28 in which said inulin is present in amounts of at least about 30% of weight of said at least one polyol and inulin.

30. The polyol composition of claim 28 in which said inulin is present in amounts of at least about 40% by weight of said at least one polyol and inulin.

31. A food composition comprising at least one polyol characterized by a reduced tendency of the polyol upon consumption to induce acute diarrhea, comprising:
at least one polyol;
said at least one polyol comprising erythritol;
inulin;
said composition containing sufficient amounts of inulin to at least partially reduce the tendency of the polyol to induce acute diarrhea upon consumption;
said inulin comprising at least about 25% by weight of said at least one polyol and inulin.

32. The food composition of claim 31 in which said inulin is present in amounts of at least about 30% by weight of said at least one polyol and inulin.

33. The food composition of claim 31 in which said inulin is present in amounts of at least about 40% by weight of said at least one polyol and inulin.

34. The food composition of claims 25, 28, or 31 further characterized in that said at least one polyol and said inulin are contained in a water base drink.

35. The food composition of claims 25, 28, or 31 in which said at least one polyol and said inulin are granular.

36. A food composition adapted to reduce the tendency of the polyol to induce acute diarrhea upon consumption, comprising:
at least one polyol;
lactose; and
inulin;
said inulin present in sufficient amounts to at least partially reduce the tendency of the at least one polyol to induce acute diarrhea when said at least one polyol is consumed in sufficient amounts to induce diarrhea in the absence of inulin.

37. The food composition of claim 36 in which said at least one polyol comprises xylitol.

38. The food composition of claim 36 in which said at least one polyol comprises lactitol.

39. The food composition of claim 36 in which said at least one polyol comprises erythritol.

40. A composition comprising at least one polyol characterized by a reduced tendency of the at least one polyol in the composition upon consumption to induce acute diarrhea, comprising:
at least one sweetening agent;
said at least one sweetening agent comprising at least one polyol; and
inulin contained in said composition in therapeutically effective amounts sufficient to at least partially reduce the tendency of said at least one polyol in said composition to induce acute diarrhea when said at least one polyol is consumed in amounts to cause diarrhea without ingestion of inulin.

41. The composition of claim 40, wherein said at least one polyol is selected from the group consisting of xylitol, sorbitol, maltitol, mannitol, lactitol, erythritol, and combinations thereof.

42. The composition of claim 40, wherein said at least one polyol comprises xylitol.

43. The composition of claim 40 in which said at least one polyol comprises lactitol.

44. The composition of claim 40 in which said at least one polyol comprises erythritol.

45. A beverage comprising the composition of claim 40.

46. A food composition comprising:
a foodstuff selected from the group consisting of ice cream, yogurt, cheese, cottage cheese, whipped toppings and desserts, frozen ice products, gelatin foods, syrups, and drinks;
said foodstuff containing:
at least one polyol;
said at least one polyol comprising xylitol;
inulin;

said food stuff containing inulin in sufficient amounts to at least partially reduce the tendency of said at least one polyol to induce acute diarrhea upon consumption of the foodstuff;
said inulin comprising at least 25% by weight of said at least one polyol and inulin.

47. The food composition of claim 46 in which said inulin comprises at least about 30% by weight of said at least one polyol and inulin.

48. The food composition of claim 46 in which said inulin comprises at least about 40% by weight of said at least one polyol and inulin.

49. A method of minimizing or eliminating polyol induced acute diarrhea upon consumption of at least one polyol, comprising:
ingesting at least one polyol in amounts sufficient to induce acute diarrhea in the absence of ingested inulin;
ingesting inulin in amounts sufficient to at least partially reduce the acute diarrhea that is induced by ingestion of said amounts of said at least one polyol in the absence of ingested inulin.

50. The method of claim 49 in which said at least one polyol comprises xylitol.

51. The method of claim 49 in which said at least one polyol comprises lactitol.

52. The method of claim 49 in which said at least one polyol comprises erythritol.

53. A composition containing at least one polyol having a reduced tendency of said composition upon consumption to induce acute diarrhea, comprising:
at least one sweetening agent,
said at least one sweetening agent comprising at least one polyol; and
inulin,
said composition containing sufficient amounts of inulin to at least partially reduce the tendency of the polyol upon consumption to induce acute diarrhea;
said inulin comprising at least about 25% by weight of the combination of said at least one polyol and said inulin,
said composition containing less than about 14% by weight of water, and wherein;
said inulin comprises polysaccharides having molecular weights of about 2288 and less in amounts of at least 75% by weight of said inulin.

54. A composition containing at least one polyol having a reduced tendency of said composition upon consumption to induce acute diarrhea, comprising:
at least one sweetening agent,
said at least one sweetening agent comprising at least one polyol; and
inulin,
said composition containing sufficient amounts of inulin to at least partially reduce the tendency of the polyol upon consumption to induce acute, diarrhea;
said inulin comprising at least about 25% by weight of the combination of said at least one polyol and said inulin,
said composition containing less than about 14% by weight of water, and wherein;
said inulin comprises polysaccharides having molecular weight of about 2284 and above in an amount of at least 75% by weight of said inulin.

55. A beverage comprising:
a sweetening agent comprising at least one polyol; and
inulin;
said inulin present in sufficient amounts to reduce the tendency of said at least one polyol to induce acute diarrhea when said at least one polyol, is consumed in amounts sufficient to cause diarrhea in the absence of inulin;
and in which said inulin is a low molecular weight fraction in which at least 75% by weight of the inulin are polysaccharides having molecular weights of about 2288 or less.

56. A food composition containing at least one polyol characterized by a reduced tendency of the polyol upon consumption to induce acute diarrhea, comprising:
at least one polyol;
said at least one polyol comprising xylitol;
inulin;
said composition containing sufficient amounts of inulin to at least partially reduce the tendency of the polyol upon consumption to induce acute diarrhea;
said inulin comprising at least about 25% by weight of said at least one polyol and inulin;
said food composition containing less than about 14% by weight of water; and
said inulin comprising at least about 75% by weight polysaccharides having molecular weights of about 2288 and below.

57. A food composition containing at least one polyol characterized by a reduced tendency of the polyol upon consumption to induce acute diarrhea, comprising:
at least one polyol;
said at least one polyol comprising lactitol;
inulin;
said composition containing sufficient amounts of inulin to at least partially reduce the tendency of the polyol upon consumption to induce acute diarrhea;
said inulin comprising at least about 25% by weight of said at least one polyol and inulin; and
said inulin comprises at least about 76% by weight of polysaccharides having molecular weights of about 2288 and below.

58. A food composition containing at least one polyol characterized by a reduced tendency of the polyol upon consumption to induce acute diarrhea, comprising:
at least one polyol;
said at least one polyol comprising erythritol;
inulin;
said composition containing sufficient amounts of inulin to at least partially reduce the tendency of the polyol upon consumption to induce acute diarrhea;
said inulin comprising at least about 25% by weight of said at least one polyol and inulin; and
said inulin comprises at least about 75% by weight of polysaccharides having molecular weights of about 2288 and below.

* * * * *